United States Patent [19]

Louth

[11] Patent Number: 4,595,868
[45] Date of Patent: Jun. 17, 1986

[54] PHASE DETECTOR CONTROL FOR A SERVO SYSTEM

[75] Inventor: Kenneth Louth, Menlo Park, Calif.

[73] Assignee: Ampex Corporation, Redwood City, Calif.

[21] Appl. No.: 707,161

[22] Filed: Feb. 27, 1985

Related U.S. Application Data

[63] Continuation of Ser. No. 608,268, May 7, 1984, abandoned, which is a continuation of Ser. No. 364,964, Apr. 2, 1982, abandoned.

[51] Int. Cl.$^4$ .............................................. G05B 11/01
[52] U.S. Cl. .................................... 318/608; 318/317; 318/327; 318/603
[58] Field of Search ............... 318/327, 603, 317, 608, 318/257, 314; 364/148

[56] References Cited

U.S. PATENT DOCUMENTS

| | | | |
|---|---|---|---|
| 3,582,541 | 6/1971 | Hebb | 318/314 X |
| 4,155,033 | 5/1979 | DeBell et al. | 318/314 X |
| 4,201,936 | 5/1980 | Roumanis | 318/314 X |
| 4,242,619 | 12/1980 | Nakamura et al. | 318/314 X |
| 4,272,818 | 6/1981 | McDaniel | 318/603 X |
| 4,371,819 | 2/1983 | Kaufmann | 318/327 X |
| 4,381,479 | 4/1983 | Wesling et al. | 318/317 |
| 4,412,161 | 10/1983 | Cornaby | 318/603 X |
| 4,413,212 | 11/1983 | Okamoto et al. | 318/327 X |

FOREIGN PATENT DOCUMENTS 2012999 11/1959 United Kingdom .

OTHER PUBLICATIONS

IEEE Transactions on Magnetics, vol. Mag-17, No. 4, Jul. 1981, pp. 1435-1437.

Primary Examiner—B. Dobeck
Attorney, Agent, or Firm—Roger Greer; Ralph L. Mossino; Bradley A. Perkins

[57] ABSTRACT

A phase detection control apparatus is disclosed for detecting any variable where the phase is discretely measured, as for example, in a motor having a tachometer of an optical type. The phase detection apparatus eliminates direction sensitivity and does not suffer from the misposition of any upper and lower limits. The apparatus achieves a phase lock without excessive overshoot and eliminates the possibility of reverse run away under any condition. Moreover, the circuitry is easily implemented with a relatively few number of circuit components and therefore accomplishes the desirable functional capabilities at relatively low cost.

18 Claims, 12 Drawing Figures

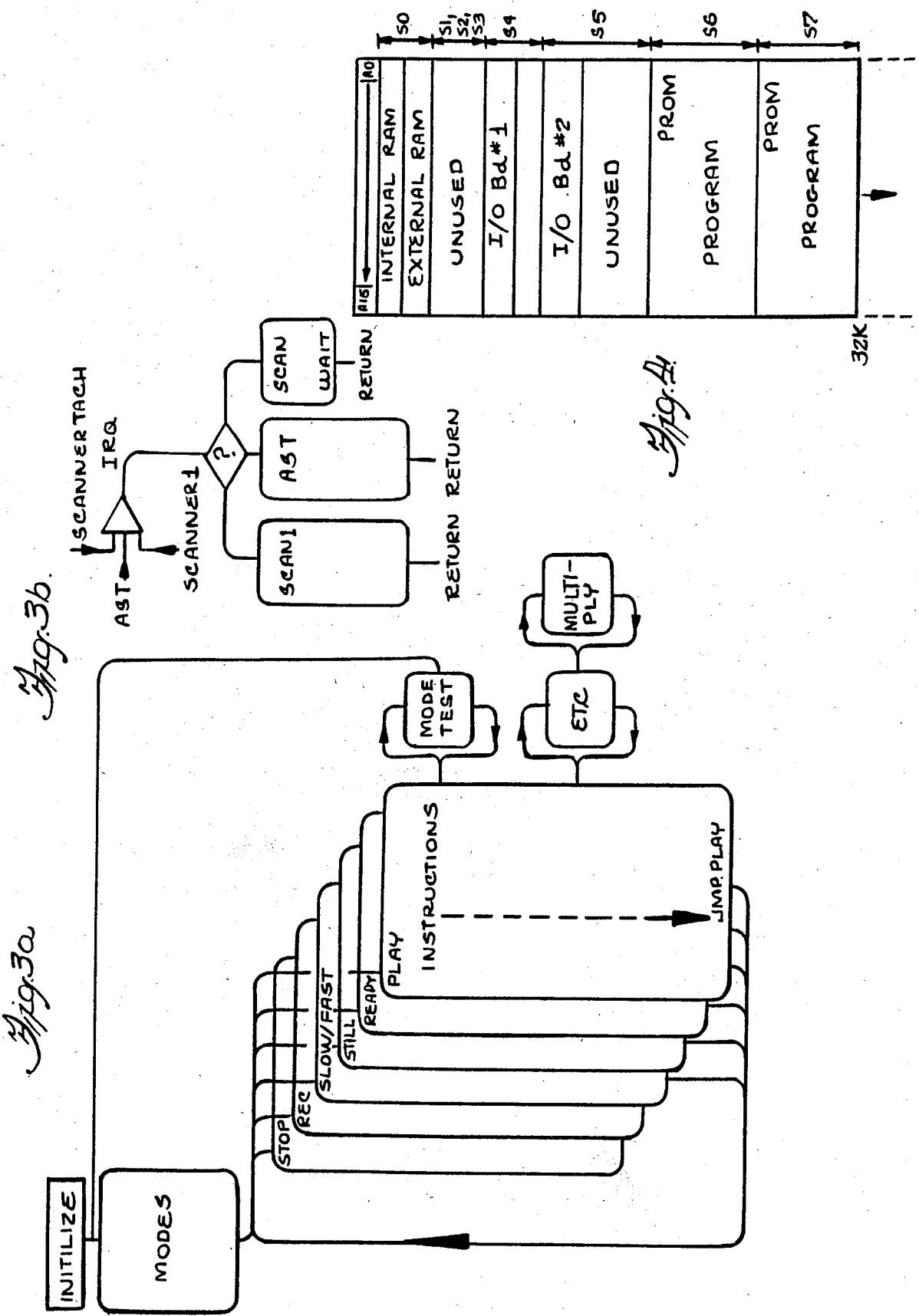

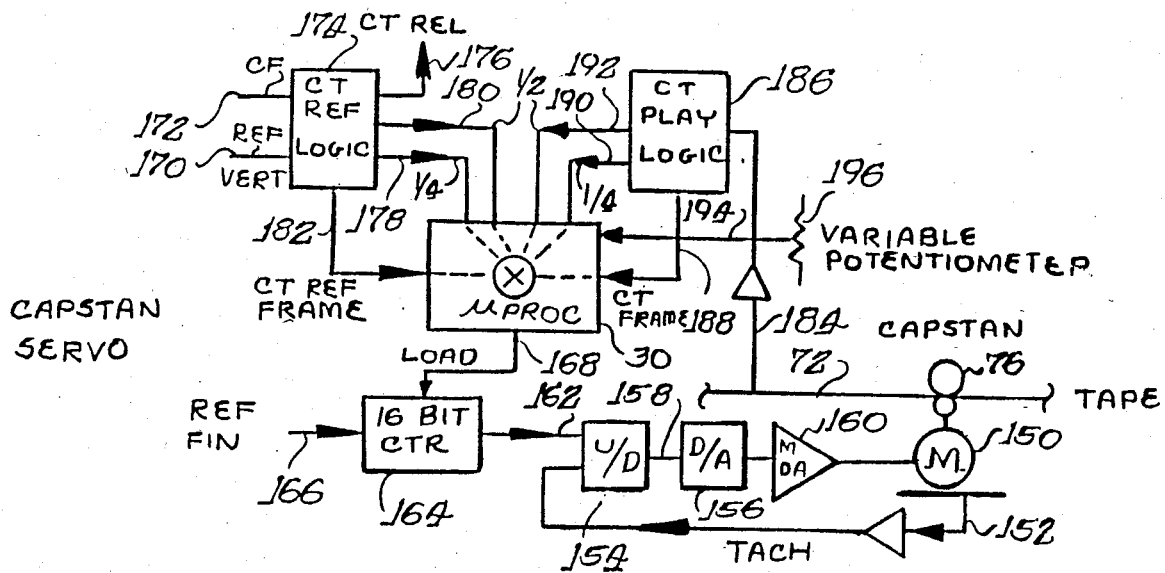
Fig. 5.
(1) TAPE TACH 
(2) REEL TACH CTR 0 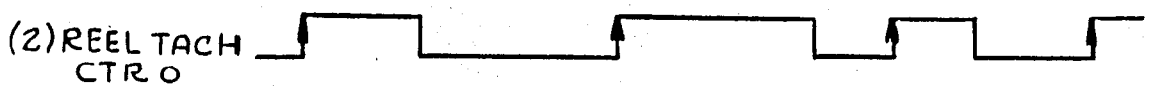
(3) REEL TACH CTR 1 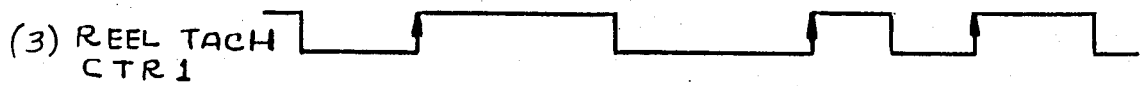
(4) CTR 464 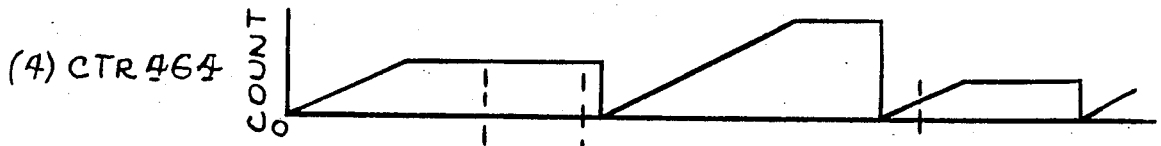
(5) CTR 466 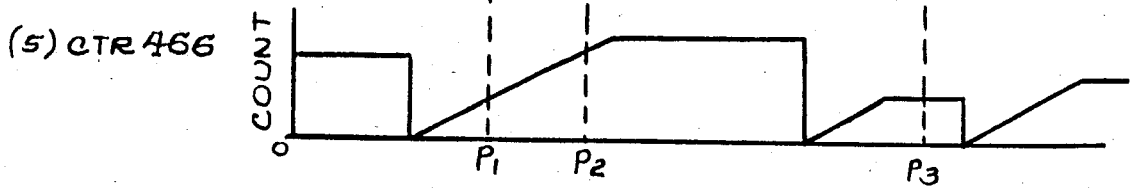
Fig. 9.

PHASE DETECTOR CONTROL FOR A SERVO SYSTEM

CROSS REFERENCE TO RELATED APPLICATIONS

This application is a continuation of application Ser. No. 608,268, filed May 7, 1984, now abandoned, which is a continuation of Ser. No. 364,964, filed Apr. 2, 1982, now abandoned.

Microprocessor Controlled Multiple Servo System for a Recording and/or Reproducing Apparatus, Ser. No. 364,725, filed Apr. 2, 1982, by Kenneth Louth.

Microprocessor Controlled Reproducing Apparatus Having Asynchronous Reproducing Capability, Ser. No. 660,453, filed Oct. 2, 1984, which is a continuation of Ser. No. 364,793, filed Apr. 2, 1982, by Kenneth Louth now abandoned.

An Improved Reel Servo System in a Recording and/or Reproducing Apparatus, Ser. No. 364,652, filed Apr. 2, 1982, by Kenneth Louth.

An Improved Automatic Scan Tracking Servo System, Ser. No. 364,961, filed Apr. 2, 1982, by Kenneth Louth.

A Programmable Nonlinear Speed Control for a Recording and/or Reproducing Apparatus, Ser. No. 364,962, filed Apr. 2, 1982, by Kenneth Louth.

An Improved Scanning Servo System in a Recording and/or Reproducing Apparatus, Ser. No. 364,963, filed Apr. 2, 1982, by Kenneth Louth.

The present invention generally relates to servo systems and, more particularly, to a phase detection control of a variable in a servo system where the phase is discretely measured.

The present invention is adapted to control a variable where the phase is discretely measured, such as a motor having a tachometer of an optical type, for example. More particularly, in the environment of the disclosure of the apparatus described herein, it is associated with a capstan servo of a recording and reproducing apparatus. Obviously, the apparatus of the present invention is adapted to detect the phase and control a drive motor for a rotatable member or of any other type of variable drive where the phase is discretely measured. Many prior art phase detection servo controlled systems are direction sensitive to the reference or to the measured feedback direction. Such systems are susceptible to running away if the control variable rate exceeds the reference rate in the reverse direction.

Accordingly, it is an object of the present invention to provide a phase detection servo control of such a variable which is incapable of running away due to any direction sensitivity of either the reference or the feedback or because of any upper or lower limits that are imposed by the circuitry.

Another object of the present invention is to provide a phase detection and servo control system of the foregoing type which provides a phase lock without excessive overshoot, and which also automatically eliminates the possibility of reverse run away if the control variable rate exceeds the reference rate in the reverse direction.

Still another object of the present invention is to provide an improved phase detection control for a servo system of the foregoing type which accomplishes the foregoing objects simply and inexpensively due to its superior design which has relatively few circuit components.

Other objects and advantages will become apparent upon reading the following detailed description, while referring to the attached drawings.

DESCRIPTION OF THE DRAWINGS

FIGS. 3a and 3b are very broad flow charts illustrating the software functional operation of the microprocessor;

FIG. 4 is map illustrating the manner in which the software instructions are located within the associated microprocessor memories;

FIG. 5, is a functional block diagram of the capstan servo system;

FIGS. 9a, b, c and d illustrate several graphs of the transfer function for the capstan servo, particularly illustrating the non-linear transfer function of the variable speed potentiometer control and the resulting capstan speed.

DESCRIPTION OF THE APPARATUS

Broadly stated, the phase detection control apparatus of the present invention is described in the environment of an apparatus which includes a microprocessor that effectively controls the major servo systems of a tape recording and reproducing apparatus, including servos which control the scanning head operation, the automatic scan tracking, the reels and the capstan, the last of which includes the specific phase detection circuitry that embodies the present invention. Since the servos other than the capstan servo are not particularly relevant to the present invention, they are not described herein, but for a full and comprehensive description of the entire servo system, reference is made to the copending application entitled "Microprocessor Controlled Multiple Servo System for a Recording and/or Reproducing Apparatus", Ser. No. 364,725, filed on even date herewith, and assigned to the assignee of the present invention. The entire specification and drawings of the application Ser. No. 364,725 is incorporated by reference herein.

Figure 1:
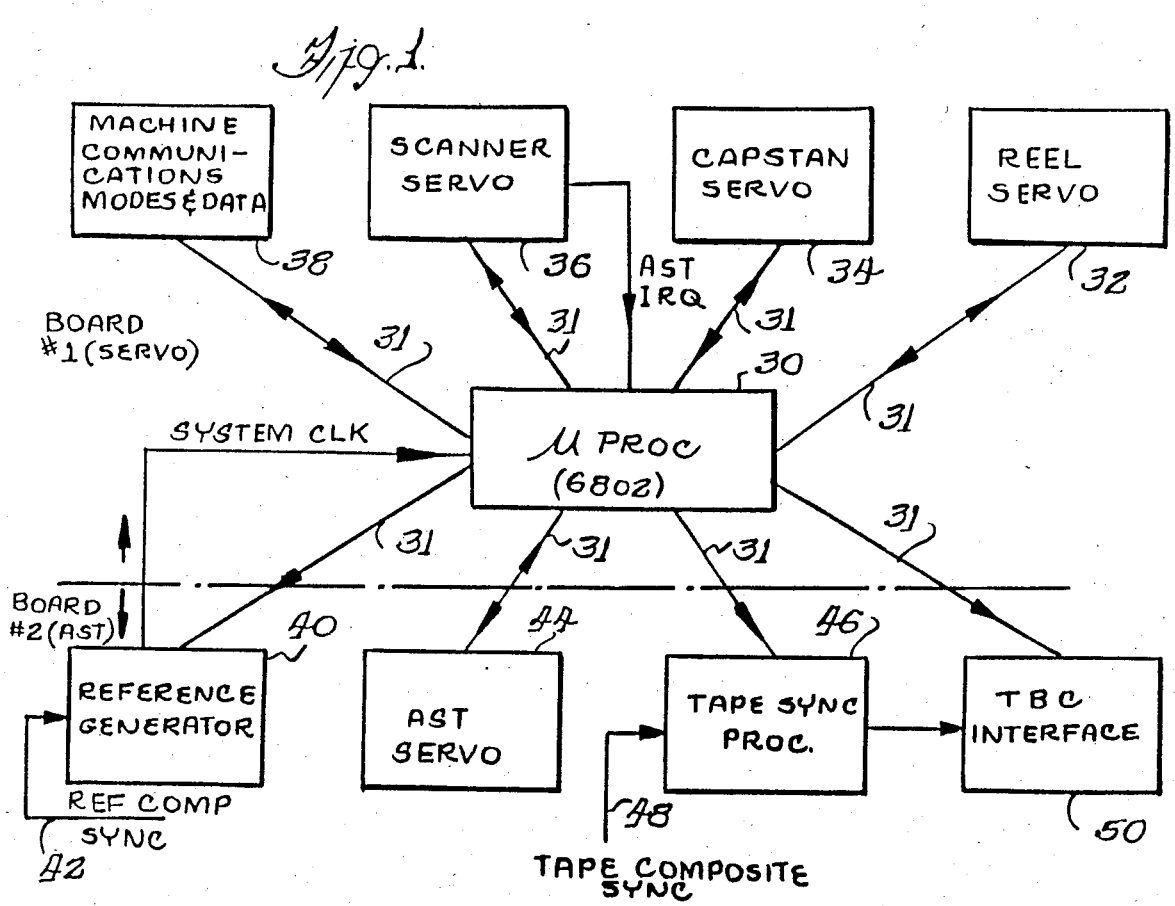
FIG. 1 is a functional block diagram illustrating the functional interaction of the microprocessor with the various servo systems of the apparatus, and of the microprocessor and other important circuitry.

Turning initially to the block diagram of FIG. 1, there if shown a microprocessor 30 which is interconnected by a data bus 31 with a reel servo 32, a capstan servo 34, a head scanner servo 36 and a machine communication interface and data 38 which essentially controls the operating modes of the recording and reproducing apparatus as manipulated by an operator either directly or from a remote location. The microprocessor also interacts with a reference generator 40 which receives as an input thereto a reference station composite sync signal via line 42 the reference generator generates system clocks that control the microprocessor and which in turn synchronizes all of the clock timing of the servos and other circuitry. The microprocessor also interacts with the automatic scan tracking servo 44 and a tape sync processor 46 which has a tape composite sync signal input via line 48. The tape sync processor additionally provides a signal to the time base corrector interface 50 which provides appropriate timing and control signals for use by the time base corrector to provide a broadcast quality video image having the requisite stability and vertical display position with respect to system reference as well as the correct chroma information, which processing varies depending upon what reproducing mode the apparatus is being operated.

Figure 2:
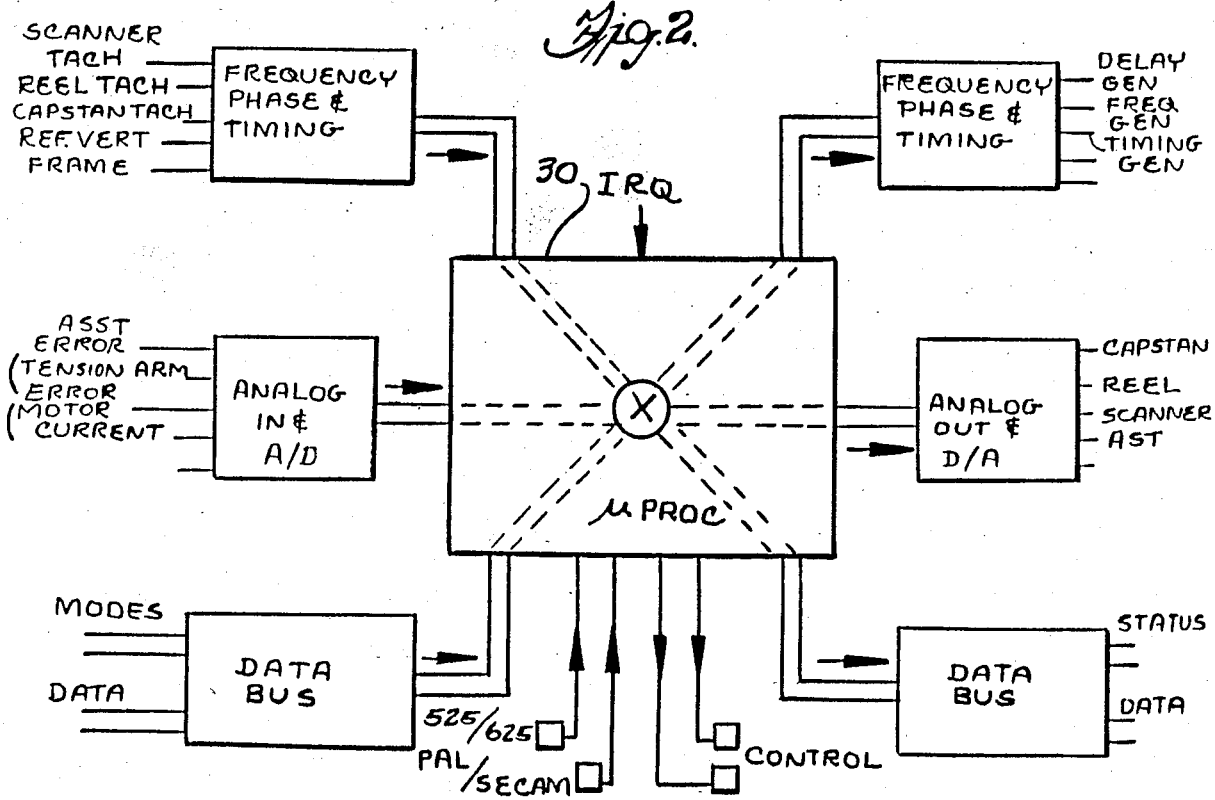
FIG. 2 is another functional block diagram of the microprocessor and illustrates the manner in which it receives input information relating to the operation of the apparatus and provides output signals that are used to control the operation of the apparatus.

While the functional block diagrams shown in FIG. 1 illustrate the interaction of the microprocessor with the various servo systems of the apparatus, with machine control and with the time base corrector and the like, the system can also be functionally described in terms of input and output signals that are provided to and from the microprocessor and this functional block diagram is shown in FIG. 2. The microprocessor 30 receives frequency, phase and timing data shown by the upper left functional block including such input signals as head scanner tach pulses, reel tach pulses, capstan tach pulses, reference vertical and frame timing signals, which are converted into digital information for processing by the microprocessor. The microprocessor also receives analog information shown by the block left of the microprocessor which is converted into digital information for processing by the microprocessor and such analog input signals include the automatic scan tracking error signals, the tension arm error signals and various signals related to motor currents of the reel drive motors, the capstan drive motor and the head scanner drive motor. The data bus also receives operating mode information as well as other machine control data and it processes this information and provides status information and other data. The microprocessor generates digital information which is converted to analog information and these analog output signals include control signals for the capstan servo, the reel servo, the head scanner servo and the automatic scan tracking servo. Similarly, the microprocessor provides frequency, phase and timing output information which include delay signals, phase and timing output information that are used by the various servos and other circuits of the apparatus.

The microprocessor controlled system of the present invention has a unique advantage in that it is adaptable for recording and reproducing video signals from any standard worldwide format, i.e., it can record and reproduce a NTSC signal having 525 lines or a PAL or SECAM signal having 625 horizontal lines. The input control line can be set to operate either as a 525 or 625 line system and the various constants and other software values which control the servos and other circuitry of the apparatus will be selected for proper operation. Similarly, another control line can be set for either a PAL or SECAM format system once a 625 line system is specified. The software in memory includes instructions and numerical constants that will permit the apparatus to properly operate regardless of the television signal format that is selected.

In accordance with an aspect of the present apparatus, the microprocessor controlled servo system described herein is adapted to control the reel servo system and the head scanner servo system during the high speed shuttle mode in a way so as to protect the recording and reproducing heads, while the tape is being wound off one of the reels onto the other. In the past, as the tape was nearing the end so as to be wound on a single reel during high speed shuttle, the potential for chipping the ceramic recording and reproducing heads was quite high. In accordance with an aspect of the apparatus described herein, during high speed shuttle, reel tape pack diameter information that is determined by the microprocessor is used to control the reel servo and the scanning head servo to perform a sequence of events which substantially reduce if not eliminate the possibility of heads being chipped. When the microprocessor determines that the tape has almost reached the end of being wound off of one reel, it controls the reel servo to stop the tape and it also the head scanner motor current to brake the rotation of the heads. After the tape has been stopped, the reel servo moves the tape at a relatively slow rate, e.g., twice normal recording speed, and the rotating head assembly is allowed to coast while the tape is wound entirely off of one reel on to the other.

The apparatus is programmed to operate in various operating modes as is shown in the broad flow chart of FIG. 3a. The flow chart representing microprocessor software shows that once the machine is initialized, a mode is selected and these modes include stop, record, slow and fast motion reproduce, stop motion or still frame reproduce, ready and normal play. Once the apparatus is placed in an operating mode, then it undergoes a mode test to determine if it is a valid mode and if such is the case, it will return to that mode and begin running the program that controls the apparatus in that mode. If the mode test is invalid, then it will return to the stop mode and the apparatus will stop. After the apparatus is placed in a valid mode, it will continue in that mode until some event occurs, such as a mode change or a completion of some operation. Included as part of each operating mode are various subroutines which are called as shown in FIG. 3a. Certain ones of these subroutines are used in various ones of the operating modes. For example, the play mode will contain a block of code instructions that will call up various subroutines in the specified order. As long as the apparatus is operating in the play mode it will repetitively go through this block of code instructions. When the head scanner tachometer pulse occurs, it will cause an interrupt to the microprocessor as shown in FIG. 3b.

The microprocessor operates on an interrupt basis, with an interrupt resulting from one of three inputs. The software determines which input caused the interrupt and the microprocessor then enters the appropriate block of code which runs through various subroutines until it reaches the end and then returns to the instruction that had previously been completed prior to the interrupt. The scanner tachometer pulse originally triggered a counter which has a count that exceeds the maximum time required to store all current relevant information in stack registers in the microprocessor. When this is done, it is ready to immediately perform the instructions in the scanner 1 block of code. This is carried out by the scanner interrupt block of code which causes the microprocessor to store the information and then literally wait for the scanner 1 interrupt. After the scanner 1 block of code is run, the microprocessor removes the information from the stack registers and resumes running through the instructions specified by the operating mode.

Complete software for operating the microprocessor for controlling all of the servos and other operations shown in the block diagrams of FIGS. 1, 2, 3a and 3b is contained in the computer code listings attached hereto as Appendix A. The program is written in a clear and concise manner to minimize the amount of memory that is required to perform the various operations. In this regard, FIG. 4 illustrates a memory map having 32,000 memory locations. As is shown in FIG. 1, the entire circuitry for the various servos and other operations are contained in two printed circuit boards with the upper first board containing most servos and the microprocessor itself and the second board containing the automatic scan tracking servo, reference generator, tape sync processor and time base corrector interface circuitry. In the memory map shown in FIG. 4, the program is written to utilize various portions of the 32K memory and the memory is segregated into eight separate 4K sections S0 through S7, which are decoded by address bits 12 through 14 which are used to place memory instructions in certain areas of the memory. For example, the address area $S_4$ is used to identify the input/output circuitry of the first board and area $S_5$ identifies a 4K section of memory wherein instructions relating to the operation of input/output portion of the second board are contained. Sections $S_1$, $S_2$ and $S_3$ are shown to be decoded but are not used during operation of the apparatus. Thus, from the illustration of FIG. 4 it should be appreciated that the entire operation of all of the servos and other operations shown in the block diagram of FIGS. 1 and 2 are carried out utilizing less than 4K of program. The operation phase detection control apparatus on a functional level, followed by a more detailed description of the servo as well as other portions of the microprocessor controlled system.

Broad Capstan Servo Description

Turning now to one particular application for the present invention, the capstan servo is illustrated by the functional block diagram of FIG. 5. The capstan servo functional block diagram illustrates that the transport of the tape 72 is controlled by the capstan 76 which has a drive motor 150 with an associated tachometer, the tachometer providing tachometer pulses on line 152 an inner servo loop. The tachometer signal is applied to an up/down counter 154, the output of which is applied to a digital-to-analog converter 156 via line 158 and its output is fed to a motor drive amplifier 160 that controls the motor 150. The up/down counter 154 also has an input line 162 extending from the output of a 16-bit counter 164 which has as a reference frequency a 4 MHz signal applied thereto via line 166. The counter essentially controls the frequency of the reference signal that is applied to the up/down counter through its output line 162. The microprocessor 30 loads a number into the counter via line 168 which determines the output frequency on line 162. Varying the number that is loaded into the counter 164 changes the division function to thereby vary the output reference signal frequency and thereby vary the speed of the capstan. An outer servo loop controls the capstan by comparing reference frame information with playback control frame information. The upper left hand portion of the block diagram illustrates the control track reference logic system which has inputs comprising the reference vertical information via line 170, the color framing information via line 172. These signals enable logic circuitry 174 to generate a control track record signal on line 176, ¼ frame and ½ frame rate signals on lines 178 and 180 and a control track reference frame signal on line 182 which latter three signals are applied to and used by the microprocessor 30 as shown. On the right side is a similar circuit which utilizes control track playback signal information from line 184 obtained from the tape during reproducing. Control track play logic circuitry 186 provides a control track frame rate signal on line 188, ¼ frame and ½ frame rate signals on lines 190 and 192, which signals are also applied to the microprocessor. The microprocessor from these signals whether the recorder must perform a color frame match operation. If the apparatus is operating as a 525 line NTSC recording and reproducing apparatus, it will color frame match using the ½ frame rate signal and if it is operating as a 625 line PAL or SECAM system, it will color frame match using the ¼ frame rate signal. The control track play logic therefore is adapted to control the tape so that proper color framing is achieved during normal reproduce operations.

There is also an input line 194 to the microprocessor which applies a signal from a variable control potentiometer 196 on the front panel of the recorder which controls the capstan and therefore the tape speed. The variable control signal is converted from analog to digital form for use by the microprocessor, which could be done by the analog-to-digital converter shown in FIGS. 6A and 6B if desired. The digital variable control signal is applied to the microprocessor which then applies a corresponding digital word to the counter 164 for controlling the speed. As will be hereinafter described, the control is nonlinearized and programmable to provide nonlinear control of capstan speed as a function of the potentiometer position and the actual tape speed. In other words, most of the possible rotational movement of the potentiometer will control the speed in the range from 1/30 of the normal play speed to ½ of the normal play speed and a small amount of the rotation of the potentiometer will control the speed from ½ of the normal play speed to normal speed and fast motion. This permits the range of actual rotation of the potentiometer to be most fully utilized in the range of speed where more accurate control is desired. Since it is programmable, it desirably places the vernier control of the capstan drive, and hence tape speed, where it is most appropriately used. The nonlinear control of the capstan drive through the potentiometer 196 enables the operator to excersise more effective control of the tape transport through observation of the display of the information reproduced from the tape particularly during slow motion operating modes.

Additionally, when there is a change between one very slow slow motion speed and another slightly faster slow motion speed, and it is changed from one to another, the microprocessor is programmed to change rapidly between the two speeds. However, when the speed is approaching normal speed, then the actual change from one speed to another will be made more slowly. The transport handles these differences in the change at the various speeds more easily, but also as the picture is viewed, rapid changes that occur during extremely slow slow motion playback are more comfortable to a viewer than rapid changes that occur during slow motion speeds that approach normal speed reproducing.

The Microprocessor Circuitry

Figure 6A:
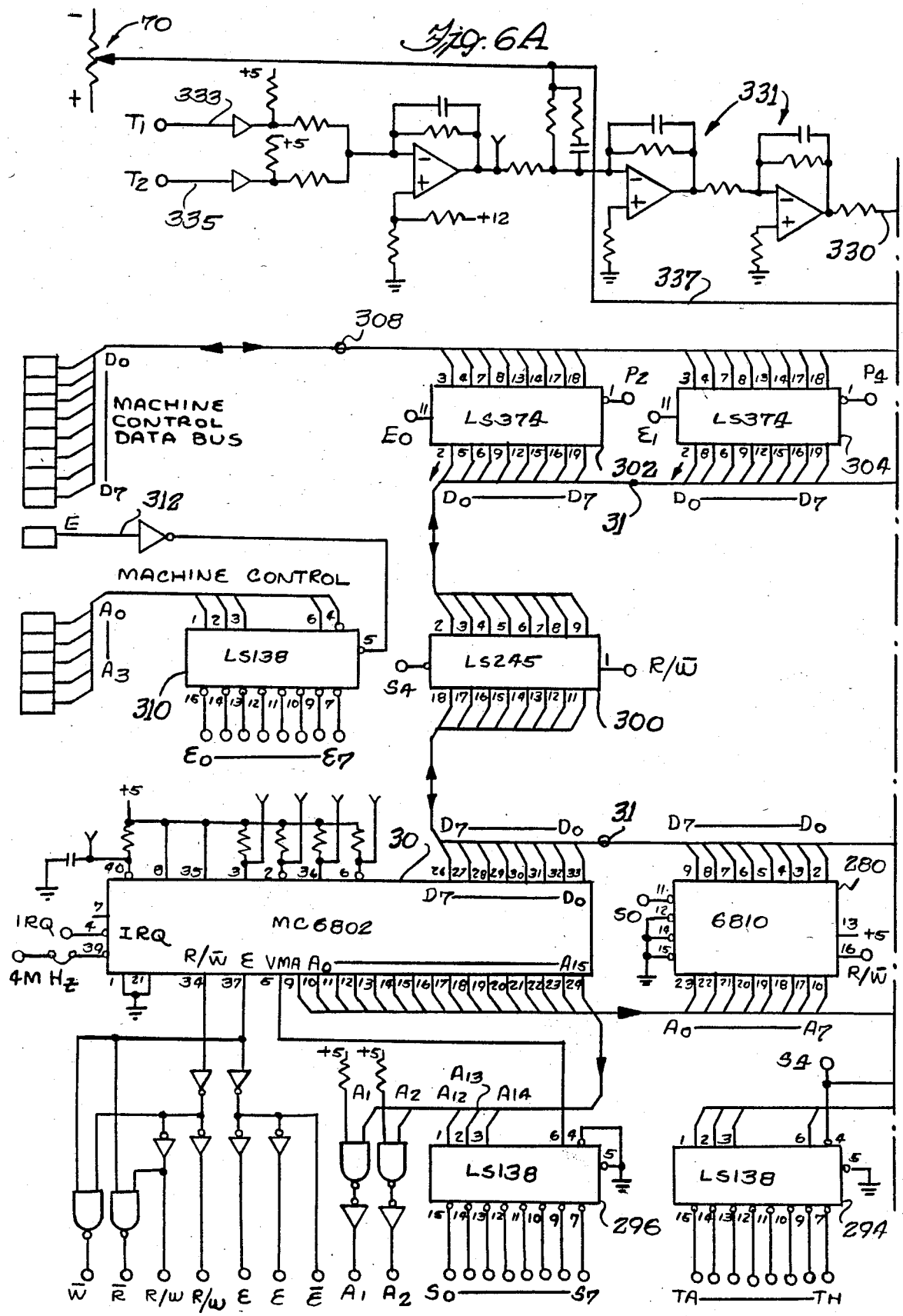
FIGS. 6A and 6B together comprise a detailed electrical schematic diagram illustrating the microprocessor together with machine control interfacing circuitry and multiplexing analog-to-digital converting circuitry.

Before describing the detailed electrical circuit schematic diagrams of the head scanner servo previously described with respect to the functional block diagram of FIG. 5, the schematic diagrams which contain the microprocessor 30 itself will be briefly described in connection with FIGS. 6A and 6B which together comprise a single schematic. As previously mentioned, and as has been shown by the block diagram of FIG. 1, the bulk of the circuitry of the apparatus described herein is contained on only two printed circuit boards and one of said printed circuit boards contains the microprocessor itself. The layout of the circuitry is such that address control of bidirectional buffers enable the data bus from the microprocessor to be connected to either the first or the second printed circuit board. As shown in FIG. 6A, the microprocessor 30, which is a Motorola integrated circuit Model MC 6802 has 16 address lines which address circuit components as well as specific addresses of memory circuits. As shown on the lower portion of the microprocessor 30 in FIG. 6A, address lines $A_0$ through $A_{15}$ extend rightwardly to a random access memory 280 which is controlled by address lines $A_0$ through $A_7$, as well as respective programmable read only memories 282 and 284 (FIG. 66B) which are controlled by address lines $A_0$ through $A_{11}$. The address lines also extend to a buffer 286 which has output lines indicated generally at 288 which extend to the second printed circuit board address lines. The lines 288 also extend downwardly to respective decoder integrated circuits 290 and 292 which are used to select ports $P_0$ through $P_{15}$. The address lines also extend to yet another decoder 294 which provides selection of various programmable timer integrated circuits $T_A$ through $T_H$.

Decoders 290, 292 and 294 are enabled when a master decode enable line $S_4$ is active and this is provided by a master decode circuit 296 located to the left of the decoder 294. As is clearly illustrated, address lines $A_{12}$, $A_{13}$ and $A_{14}$ from the microprocessor 30 control the address selection master decode enable output lines $S_0$ through $S_7$ that activate various portions of the circuitry. For example, when active the decoded output line $S_0$ enables the random access memory 280, decode output $S_6$ enables the memory 282 and decode output $S_7$ similarly enables memory 284. The data bus 31 from the microprocessor comprises eight output lines $D_0$ through $D_7$ extending to the memories 280, 282, 284 as well as to bidirectional buffers 298 and 300. Buffer 290 has output lines that extend the data bus to the second printed circuit board, and it is activated by the decode output $S_5$. Activation of the decode output $S_4$ enables the decoders 290, 292 and 294 as well as the other bidirectional buffer 300 which effectively extends the data bus to the remaining circuitry shown in the upper portion of FIGS. 6A and 6B and to remaining circuitry on board No. 1.

Figure 6B:
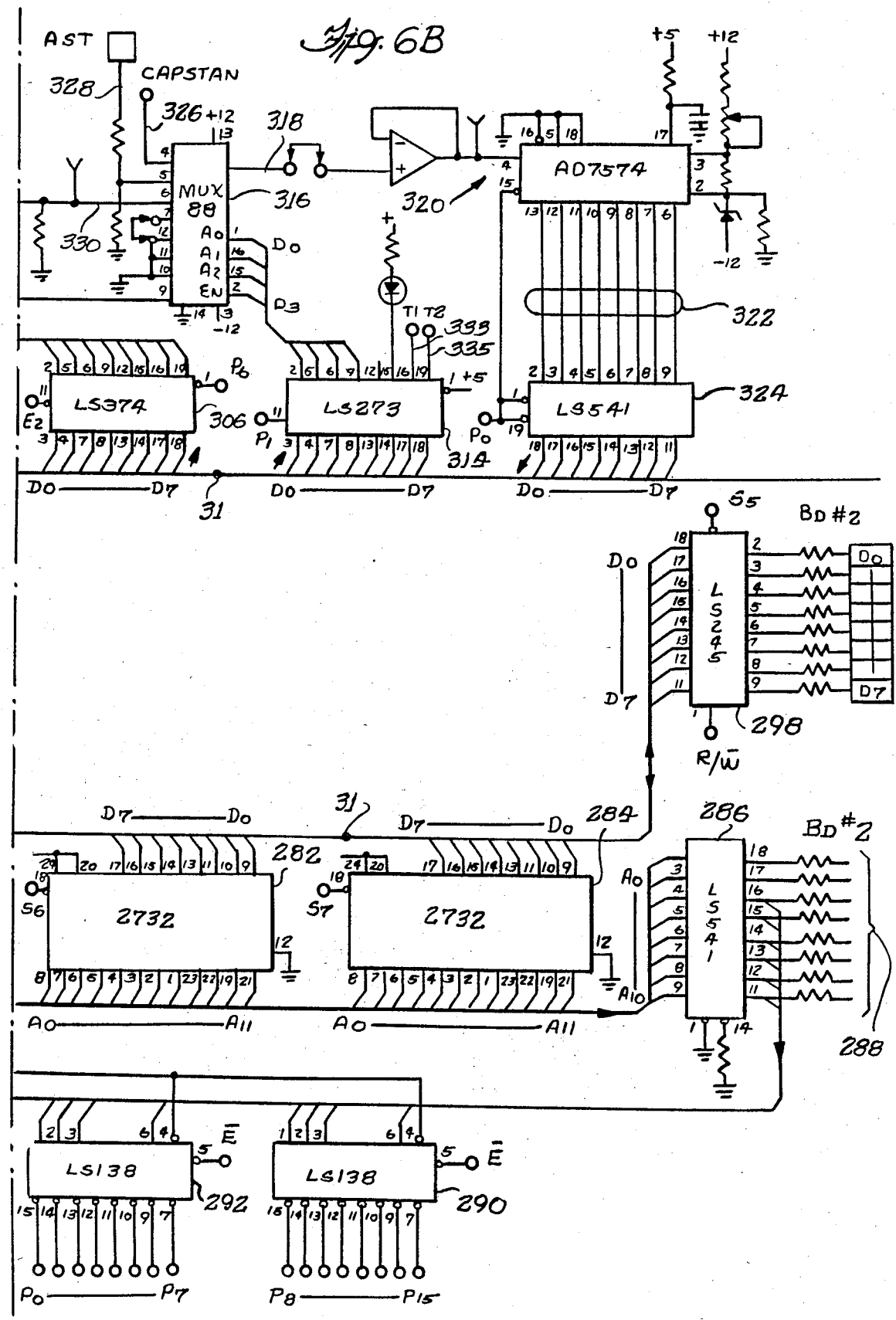

As shown in FIG. 6A, the data bus 31 has input latches 302 and 304 connected thereto and an output latch 306 being shown in FIG. 6B. The data lines 308 are also connected to these latches and the lines 308 represent a data bus to the machine control system which has a separate microprocessor controlled system for carrying out other machine control functions of the apparatus independently of the system controlled by microprocessor 30. The interaction of operator control and mode switches, diagnostics and the like with the servo system of the present invention is carried out through this data bus via the latches 302, 304 and 306. These latches are respectively enabled by enable lines $E_0$, $E_1$ and $E_2$ which are decoded outputs of a decoder circuit 310 that has operator activated address lines $A_0$ through $A_3$ from the machine control system. The decode circuit 310 is enabled by a line 312 from the machine control system. By selectively enabling decode output lines $E_0$, $E_1$ and $E_2$, data can be input into the latches 302 and 304 for communication onto the data bus of the microprocessor 30 and enabling the latch 306 permits data from the microprocessor 30 to be latched therein for communication to the machine control system via lines 308.

The remaining portion of the circuitry shown in the upper portion of FIGS. 6A and 6B concern the analog information input that is provided to the microprocessor 30. When port $P_1$ from decoder 292 is active, a latch 314 that is connected to the data bus can receive a data word which decodes an address for controlling a multiplexing switch 316. The switch 316 selects one of the left inputs thereof for application onto line 318 that extends to an analog-to-digital converter, indicated generally at 320, having output lines 322 which extend to a latch 324 which applies data onto the data bus for use by the microprocessor when a port line $P_0$ is enabled from the address decoder 292.

The multiplexing switch 316 can select a capstan servo control track error signal applied via line 326, an automatic scan tracking movable element position error signal applied via line 328 or a signal that is indicative of the position of the tension arm 70 applied via line 330. The circuitry at the upper portion of FIG. 6A provides an analog signal on line 330 that represents the position of the previously described tension arm through appropriate loop compensation circuitry indicated generally at 331. The arm positional reference for forward and reverse arm locations during shuttle and still frame reproducing is set by coding lines 333 and 335 by means of the output latch 314 from the microprocessor. In addition, line 337 can be selected to measure the actual mechanical arm position for tape threading and unthreading.

Figure 8:
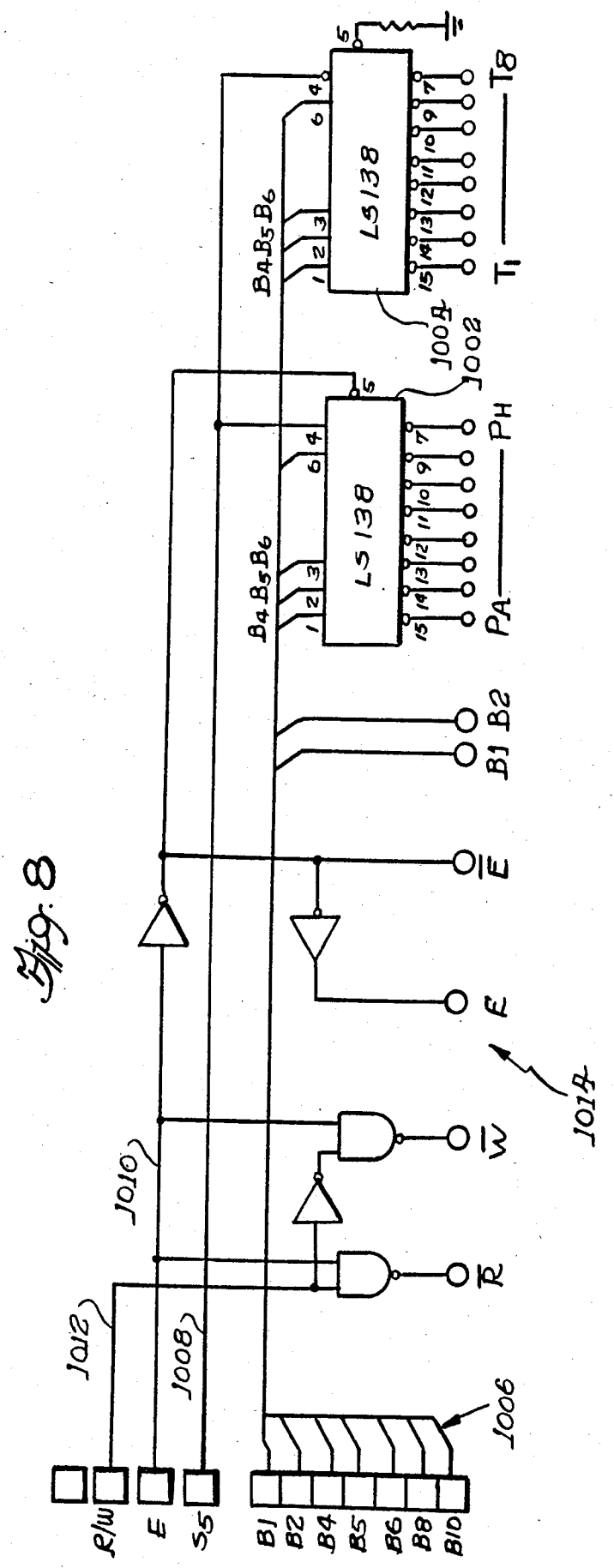
FIG. 8 is a detailed electrical schematic diagram of a board decode circuitry of the apparatus embodying the present invention.

Two sets of port and timer circuit decoders are employed in the preferred apparatus of the invention. One set has been previously described with reference to FIGS. 6A and 6B, namely port decoders 290 and 292 (FIG. 6B) and timer circuit decoder 294 (FIG. 6A). FIG. 8 illustrates the second set of decoders comprising port decoder 1002 and timer circuit decoder 1004. The first set of decoders illustrated in FIGS. 6A and 6B respond to selected ones of the address signals A0–A15 issued by the microprocessor 30, selected ones of the master enabling signals S0–S7 issued by decoder 296 and system clock signal E to enable selectively ports and timer circuits of the machine communication circuitry 38, scanner servo 36, capstan servo 34 and reel servo 38 (FIG. 1). The second set of decoders illustrated in FIG. 8 similarly function to issue selectively port enabling signals (decoder 1002) and timer circuit enabling signals (decoder 1004) to the reference generator 40, the AST servo 44, tape sync processor 46 and TBC interface 50 (FIG. 1). More specifically, the second set of decoders receives buffered address signals over lines 1006 from the buffers 286 (FIG. 6B). These address signals together with master decode select signal 85 received over line 1008 from the master decoder 296 (FIG. 6B) and the system clock signal E received from the microprocessor 30 over line 1010 enable the decoders 1002 and 1004 to issue the port and timer circuit enabling signals according to the functions being performed by the apparatus as determined by the operator manipulated controls and the controlling microprocessor software. In addition, the second set of decoders receives a read/write command W from the microprocessor 30 (FIG. 6A) over line 1012 and, through logic 1014 comprising NAND gates and inverters, generates retimed read command $\overline{R}$, write command $\overline{W}$ and oppositely phased master clock signals E and $\overline{E}$. These signals are employed together with the port and timer circuit enable signals to control the operation of aforementioned reference generator 40, AST servo 44, tape sync processor 46 and TBC interface 50.

The Capstan Servo Circuitry

Figure 7A:
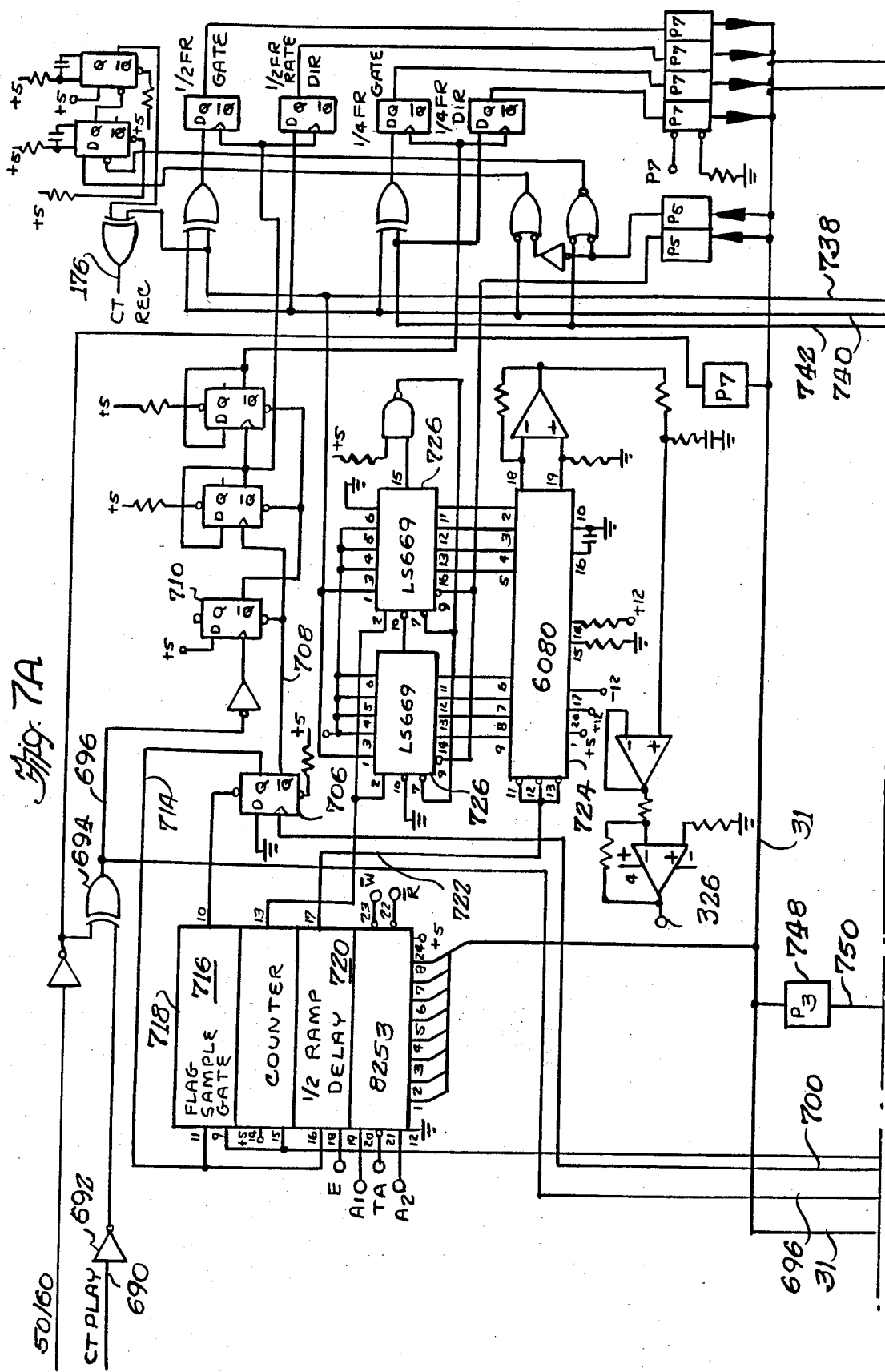
FIGS. 7A and 7B together comprise a detailed electrical circuit schematic diagram of the capstan servo circuitry of the apparatus, which detailed circuitry carries out the operation of the block diagram shown in FIG. 5.
Figure 7B:
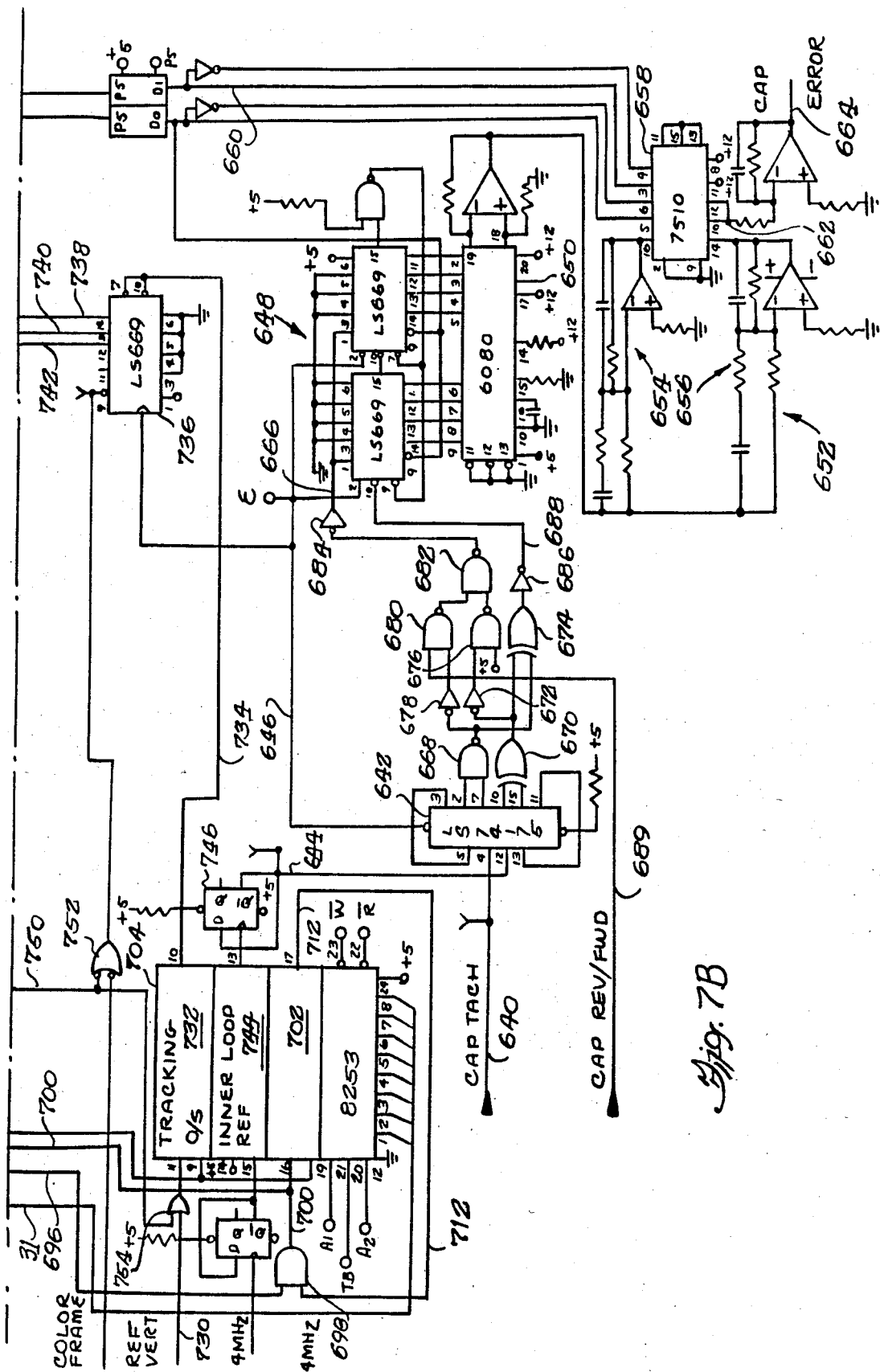

The capstan servo described in the block diagram of FIG. 5 is carried out by the detailed circuitry shown in FIGS. 7A and 7B. The capstan tachometer signal is applied on line 640 (FIG. 7B) which extends to a D latch which is part of the quad D latch integrated circuit 642 and the reference input frequency signal is applied via line 644. The latches are clocked by the microprocessor output clock E via line 646 and this clock also clocks an up/down counter 648, the output of which is applied to a digital-to-analog converter 650 which provides an analog output signal to the drive amplifier circuitry, indicated generally at 652. The circuitry includes a high gain section 654 and a low gain section 656 and a switching circuit 658 controlled by the microprocessor to either provide a high or low gain error signal. Line 660, controlled by the microprocessor, controls the switching circuit 658 to either apply the high gain signal from the upper circuitry 654 or the low gain signal from the lower circuitry 656 through the switcher onto line 662 which results in the capstan error signal being produced at the output line 664.

The circuitry shown in FIG. 7B effectively compares the phase of the reference on line 644 with the phase of the capstan tachometer on line 640 and provides a capstan servo error signal to control the precise speed of the capstan. The illustrated circuitry has the advantage that it does not suffer from common problems that can cause a servo system to run away in that it is incapable of doing so because of the absence of any capstan direction sensitivity or any upper or lower speed limits. The circuitry provides an analog output which achieves a phase lock without excessive overshoot and eliminates the possibility of reverse run away, even if the control variable rate, i.e., the capstan tachometer, exceeds the reference rate in the reverse direction. More specifically, common prior art capstan servos can run away in two different ways. The first can occur if the polarity of the feedback is reversed from that defined according to the normal capstan direction without a corresponding reversal of the generated error. The second way in which the capstan can run away occurs when the up/down counter is permitted to roll-over when the count limit conditions are reached. The present circuitry automatically overcomes these problems by virtue of the fact that it automatically compensates for the capstan direction or error changes.

The circuitry uses the fully synchronous up/down binary counter 648 and appropriate gating to enable the counter and to control an up/down control line 666. The reference input and tachometer inputs are automatically guided to increment or decrement the counter 648 in accordance with the direction lines. The output of the D latches for the capstan tachometer line 640 is applied to a NAND gate 668 and the reference signal is gated through the D latch and it is connected to an EXCLUSIVE OR gate 670. The NAND gate 668 provides a low output for every positive transition of the capstan tachometer pulse and this low output signal has a duration of one clock period. The reference signal that is applied through the D latch to the EXCLUSIVE OR gate 670 produces a low signal for every transition of the reference signal and this low signal also lasts for one clock period. The output from the EXCLUSIVE OR 670 is applied to an inverter 672, as well as to one input of another EXCLUSIVE OR gate 674, with the output of the inverter 672 being applied to a NAND gate 676. The NAND gate 668 output is applied to an inverter 678, as well as to the other input of the EXCLUSIVE OR gate 674. The output of the inverter 678 is applied to one input of a NAND gate 680 and the outputs of NAND gates 680 and 676 are applied to NAND gate 682, the output of which extends via an inverter 684 and line 666 to the up/down control of the up/down counter 648. The output of the EXCLUSIVE OR gate 674 is applied through an inverter 686 and line 688 to the enable the input of the up/down counter 648.

The operation of the logic circuitry is effective to control the up/down control line 666 so as to change the digital value of the counter in the proper direction to reduce the error. If the system contains no error, then the reference and capstan tachometer signals will be coincident and in such event, low outputs will be produced by the NAND gate 668 as well as the EXCLUSIVE OR gate 670 and both inputs will cause the EXCLUSIVE OR gate 674 to disable the up/down counter so that it will neither be incremented or decremented by the clock. If only one of the gates 668 or 670 is active, then the logic circuitry will cause the up/down line to be controlled at the proper signal level so as to either increment or decrement the counter in the correct direction to reduce the error. The gate 680 also has one input supplied by a capstan forward and reverse control line 689 which automatically steers the logic to control the up/down control line so as to reduce the error regardless of the direction the capstan is being driven.

In accordance with the another aspect of the capstan servo, the recorded control track information is used in the conventional manner and this operation is also accomplished under microprocessor control. As shown in FIG. 7A, the control track signal on input line 690 is applied through inverter 692 and EXCLUSIVE OR gate 694, whose output appears on line 696 which extends downwardly to an AND gate 698 (FIG. 7B) that has its output line 700 applied to the input of a one-shot multivibrator 702 that is part of programmable timer chip 704. Line 700 also extends to clock a D flip-flop 706 (FIG. 7A) which has a $\overline{Q}$ output line 708 that clears a flip-flop 710 that provides a playback flag. The freewheeling one-shot 702 has output line 712 that extends to the other input of the AND gate 698 and the AND gate and one-shot operate to block any spurious control track signals that may be present on line 696 until shortly before the control track pulse is expected to occur, at which time the free-wheeling one-shot changes state to enable the legitimate control track pulse to be applied and be gated through the AND gate 698 and again trigger the one-shot 702. In the event that a control track pulse is not present, then the change of state of the free-wheeling one-shot 702 timing out will similarly cause an output signal on line 712 and the AND gate will provide a clock signal on line 700 to flip-flop 706 in the same manner as would an actual control track pulse. The only difference is that it will be slightly advanced relative to when it should occur which will cause a slight drift in the rate of the control track, but will not be of sufficient magnitude to create any significant problem during the time that control track is not present. An output line 714 from flip-flop 706 is applied to the input of a flag sample gate counter 716 of a programmable timer chip 718 as well as a ½ ramp delay one-shot 720, the latter of which provides an output on line 722 which triggers a digital-to-analog converter 724 which samples the value of up/down counter 726 which contains the digital values of the control track signal. The ½ ramp delay 720 effectively causes the digital-to-analog converter 724 to sample the value of the counter 726 at the mid-point of the frame signal and properly times the control track playback signal. Stated in other words, the digital-to-analog converter 724 is triggered by the ½ ramp delay 720 so that the control track sample which is delayed from the actual control track by ½ ramp delay results in the actual control track and the actual reference being in phase.

The capstan servo circuitry programmable timer chip 704 (FIG. 7A) has a reference vertical input signal on line 730 which is applied to a tracking one-shot 732. During reproducing, the tracking one-shot is programmed to directly follow the reference vertical and apply a pulse on output line 734 which is applied to a counter divider 736 that in turn provides various output signals, such as a frame rate signal on line 738, a ½ frame rate signal on line 740, and a ¼ frame rate signal on line 742. During normal operation, the frame signals will be synchronized to reference vertical and is phase adjustable by operation of the control track phase control.

In accordance with an important aspect of the present invention, a very significant functionally desirable capability is possible by virtue of the programmable timer chip 704 and particularly the tracking one-shot 732 therein in that it can be reprogrammed to operate as a rate generator and provide an output that varies slightly relative to the input reference. Thus, the output signal on line 734 may be one count in 40,000 counts different relative to the reference vertical or any other difference can be programmed by the microprocessor so that a definite time compression or expansion of the reproduction can be obtained if desired. This would permit an entire program to be speeded up or slowed down to fit the time slot that is desired and it can be done without removing any particular segment of the program. All that needs to be done is to reprogram the tracking one-shot section of the timer chip 704 to provide a time difference that will result in either a time expansion or compression of the program and all of the program content will still be present during reproducing.

It should be appreciated that when a video tape is recorded on one apparatus and is played back on another, there is an interchange problem which can create time variations that are greatly in excess of the difference that may be programmed into the tracking one-shot. Therefore, to insure that the program will be actually expanded or compressed by the desired amount, it is necessary that the apparatus still maintain control track lock of the capstan servo. When such is done, then the rate generator operation from the tracking one-shot will effectively perform the time expansion or contraction that is programmed into the apparatus as is desired.

To accomplish the asynchronous playback that has been described, reference is made to FIG. 7B which has the reference vertical signal applied via input line 730 as previously described. During normal playback, the output of the one-shot 732 provides a delay time that is a function of a control track phase adjustment potentiometer which is located on the front panel of the apparatus and which is a part of the operator controlled machine control system. The output from the tracking one-shot 732 appears on line 734 to the divider 736 and the frame output on line 738 is used to control the up/down line of the counter 726 shown in FIG. 7A. The value of the counter is latched into the digital-to-analog converter 724 by the control track playback frame pulse on line 722 which thereby generates a control track error voltage that appears at the output of the digital-to-analog converter 724 and which ultimately results in a signal at output line 326 that is one of the inputs to the analog-to-digital converter circuit 320 shown in FIG. 6B. The circuitry of FIG. 6B converts the analog value to an 8-bit word that is applied to the microprocessor 30 through the multiplexed analog-to-digital converter 320 shown in FIG. 6A. The microprocessor converts the data to a 16-bit word which it applies to an inner loop reference counter 744 (FIG. 7B) which clocks a D flip-flop 746 that operates as a divide-by-two and provides the reference input signal on line 644 which closes the control track servo loop.

When the apparatus is operating in the asynchronous playback mode, the microprocessor 30 is programmed to write a high signal to a latch 748 which has an output line 750 that extends to gates 752 and 754 (FIG. 7B). The high signal on line 750 effectively disables the loading operations that would occur in the divider 736 and it additionally forces the input to the tracking one-shot 732 high to enable it to begin counting. The tracking one-shot is thereby changed to be a rate generator that produces an output vertical reference frequency that is programmable by the microprocessor. Since the input to the counter 732 is the studio reference clock frequency, the output can be programmed to be different from the normal reference vertical by the expression $$\frac{F \text{ input clock}}{\text{Normal count}} \pm \frac{F \text{ input clock}}{\text{Programmed count}}$$

The programmed count can be derived from a local or a remote source. It should be appreciated that since the tape will be moving at a speed that is slightly different from the normal record or reproduce speed to accomplish the desired time compression or expansion, the automatic scan tracking head will occasionally be required to make a track jump. For this reason, the automatic scan tracking servo and time base corrector operation is switched from normal play to variable play so that the desired track jumps can be carried out.

As has been previously described with the block diagram of the capstan servo shown in FIG. 5, the variable potentiometer 196 for controlling the slow motion reproducing of the apparatus provides an analog potentiometer signal which is converted into an 8-bit word that is applied to the microprocessor. The microprocessor 31 then processes the 8-bit data word to provide a nonlinear function for the purpose of accomplishing the desired feel of the apparatus in terms of the speed of response as a function of the amount of arcuate movement of the potentiometer which is also a function of the speed at which the capstan is being driven. This operation can be more readily appreciated from FIG. 9a which shows a transfer function of the speed versus the processed input data word from the potentiometer 196. As has been described with respect to FIG. 5, the microprocessor loads a 16-bit word into counter 164 via load lines 168 (which in actuality is the data bus 31) which in FIG. 7B, comprises the inner loop reference counter 744 of the timer chip 704. By changing the 16-bit number that is applied to the counter, a different output value on line 162 is applied to the up/down counter 154 which effectively changes the speed of the capstan by virtue of the inner loop control.

While the microprocessor receives an 8-bit word, it performs a multiplication function to obtain the 16-bit word which is applied to the counter 164. The result is the nonlinear transfer function as shown in FIG. 9a wherein the speed increases as the value of the 16-bit number decreases. The output speed is inversely proportional to the value of the number applied to the counter. The transfer function shown in FIG. 9a is undesirable for the reason that it does not provide the desirable feel to an operator for controlling the speed during the variable motion reproducing.

When the unit is operating at very slow speeds, a two unit angular change of the potentiometer may result in a one percent change in the reproducing speed and there therefore is no significant stepped speed change involved in making the two unit angular change of the potentiometer. However, when the apparatus is reproducing at higher speeds, i.e., close to normal reproducing speed or faster than normal speeds, a two unit angular change in the setting of the potentiometer may result in a 20 percent change in the output frequency which can make a very pronounced and stepped speed change in the image being viewed.

Accordingly, it is desired to change the shape of the transfer function in a manner shown in FIG. 9b and this is accomplished by further processing the 8-bit word beyond a mere multiplication. This is accomplished by multiplying the 8-bit word by the function $K+(8\text{-bit word})^3/255$. This results in the representation shown by the solid line of FIG. 9b. The microprocessor also limits the minimum number that can be provided to the counter so as to limit the output speed at $1\frac{1}{2}$ times the normal reproducing speed. The curve of FIG. 9b then is shaped to provide smaller increments of actual speed change per unit change of the position of the potentiometer until it reduces to below normal play speed whereupon changes of values of the potentiometer more rapidly change the speed in the slower speeds. The dotted representations on each side of the solid representation show possible variations in the function that can be accomplished by varying the expression. The number 255 diviser of the function is intended to maintain the 16-bit word within the limits of zero and 64,000, the range of the 16-bit counter. If the ultimate multiplication result was greater than 64,000, then a discontinuity in the curve could result which would be extremely undesirable.

In accordance with another aspect of the nonlinearization of the slow motion variable potentiometer control, the viewer is much more able to observe the visual effects of the rate of change of the variable motion image at high speeds than at low speeds. Stated in other words, at very slow slow motion speeds, for example, in the range of 1/30 to 1/15 of normal speed, changes between one speed and another can be done rapidly without providing any disturbing visual effect to an observer. However, at high speeds, e.g., a change of from normal to $1\frac{1}{2}$ times normal speed cannot be done rapidly without providing a significant disturbing effect on a viewer. Therefore, it is desirable to make changes between speeds at high speed more slowly than is done during changes at slow slow motion speeds. Such variation is also accomplished by the apparatus of the present invention and this is illustrated by FIGS. 9c and 9d. In FIG. 9c, a instantaneous change in the potentiometer from zero to $1\frac{1}{2}$ times the normal play speed, e.g., the input line shown by the solid representation of FIG. 9c, results in an actual response time to accomplish the speed change that is shown by the dotted representation. Similarly, if the speed is instantaneously changed from $1\frac{1}{2}$ times play speed down to zero as shown in the right of FIG. 9c, the actual speed will ramp down as shown by that dotted representation.

The present apparatus desirably varies the response, effectively delaying it when the speed is operating close to normal speed and above. This is accomplished by inserting a time delay into the response wherein the amount of delay provided is a function of the actual speed that the tape is moving. The speed that is required dictates a certain 16-bit number that is applied to the counter 164 and this number is compared with the actual speed in order to increment or decrement the count that is to be applied to the counter. If the actual speed is one that is in the range of the normal playback speed or faster, then an increased time delay will be provided in reaching the required number so that the rate of change of speed will be decreased as the actual speed is increased. This is shown in FIG. 9d wherein the actual speed response to an instantaneous change from zero to $1\frac{1}{2}$ times play shows a response that rises rapidly, i.e., very little delay in the early portion thereof and then increased amounts of delay are inserted so that the rate of change of speed is decreased as the actual speed increases. When the speed is instantaneously changed from $1\frac{1}{2}$ times normal to zero, the actual speed change is delayed to change more slowly from the higher speeds and changes more rapidly at the slower speeds.

Conclusion

From the foregoing detailed description, it should be appreciated that an improved phase detection control apparatus has been described which accomplishes the objects previously set forth. The phase detector automatically compensates for the direction of the reference as well as the controlled variable. Moreover, the circuitry provides an analog output which achieves a phase lock without excessive overshoot and which automatically eliminates the possibility of reverse run away.

It should be understood that although preferred embodiments of the present invention have been illustrated and described, various modifications thereof will become apparent to those skilled in the art; and, accordingly, the scope of the present invention should be defined only by the appended claims and equivalents thereof.

Various features of the invention are set forth in the following claims.

What is claimed is:

1. Apparatus for providing phase detection and control of a variable were the phase is discretely measured, comprising:
   means for providing a system clock for said apparatus;
   means for latching the level of a two level reference signal applied thereto, in response to said system clock signal being applied;
   means for latching the level of a two level feedback signal applied thereto from the controlled variable in response to said system clock being applied;
   a digital counting means adapted to be selectively incremented or decremented in response to clock signal being applied when said counting means is enabled by an enable line, the incrementing or decrementing being determined by a control line;
   digital-to-analog converting means connected to said counting means for providing an analog output signal that is proportional to the value of the count contained in said counting means;
   circuit means interposed between and connected to said latching means and said counting means for controlling said control line and enable line, said means including feedback and reference direction input lines, said means disabling said enable line when reference and feedback latching means are simultaneously active and controlling said control line to have the system clock decrement or increment said counting means when only one of said latching means is active, said means automatically controlling said control line to properly increment or decrement said counting means even when the direction of said feedback and reference are changed.

2. Apparatus as defined in claim 1 wherein each of said latching means comprises a D flip-flop, the output thereof having the input level that was present during clock time and the output level being constant for a complete clock period.

3. Apparatus as defined in claim 1 wherein said circuit means includes:
   a first gating means connected to said reference latching means for providing an active output of one clock period for every positive transition that is applied to the input thereof;
   second gating means connected to said feedback latching means for providing an active output of one clock period duration for every transition that is applied to the input thereof; and,
   third gating means connected to said first and second gating means and to said enable line of said counting means for disabling said counting means when said first and second gating means are active.

4. Apparatus as defined in claim 3 wherein said circuit means includes a fourth gating means connected to said first and second gating means and having reference and feedback directional inputs, the output thereof controlling the level of said control line to increment or decrement said counting means to provide an error signal that will change the control variable toward the reference.

5. Apparatus as defined in claim 4 wherein said first gating means comprises a NAND date.

6. Apparatus as defined in claim 4 wherein said second gating means comprises an EXCLUSIVE OR gate.

7. Apparatus as defined in claim 4 wherein said third gating means comprises an EXCLUSIVE OR having an output connected to an inverter, the output of the inverter being connected to said counting means.

8. Apparatus as defined in claim 1 wherein said counting means comprises a 4-bit binary up/down counter having a control line, which controls the incrementing or decrementing thereof in accordance with the level of said control line, and an enable line which enables said counter to be incremented or decremented in accordance with the appropriate level being applied to the control line.

9. Apparatus as defined in claim 4 wherein said fourth gating means comprises a NAND gate having one input supplied by a feedback direction line and the other input supplied by the output of an inverter, the input of which inverter is connected to the output of said first gating means, a second NAND gate having one input supplied by the reference direction line, the other of which is supplied by the output of an inverter, the input of which inverter is provided by the output of said second gating means, the first and second NAND gate outputs being connected to inputs of an AND gate the output of which is connected to said control line of said counting means.

10. Apparatus for detecting and controlling the speed of a movable member, comprising:
    means for providing a reference signal related to a desired speed of said movable member;
    means for providing a feedback signal indicative of the actual speed of said movable member, means providing a phase difference between said reference signal and feedback signal indicative of a difference in speed of said movable member from said desired speed;
    means for providing a direction signal indicative of the direction of movement of said movable member relative to a reference direction of movement of said movable member;
    an up/down counter for counting clock pulses;
    means responsive to said direction signal and at least one of said reference and feedback signals for controlling said counter to selectively count up or down in dependence upon the direction of said phase difference between said reference and feedback signals when said direction signal indicates said direction of movement is the same as said reference direction, and for controlling said counter to count in only one direction when said direction signal indicates direction of movement is different from said reference direction;
    means responsive to said up/down counter for adjusting the speed of said movable member.

11. The apparatus of claim 10 wherein said means for adjusting is adapted to receive an adjustment count from said up/down counter, such that when said direction signal indicates direction of movement is different from said reference direction and said up/down counter counts in only one direction, the adjustment count approaches a set count and said means for adjusting correspondingly adjusts the speed of said movable member to approach a set speed.

12. The apparatus of claim 11 wherein said means for adjusting the speed of said movable member comprises an analog-to-digital converting means which produces a signal which is used to control the speed of said movable member.

13. The apparatus of claim 10 wherein said movable member is a capstan.

14. The apparatus of claim 10 wherein said means for controlling said counter comprises logic gate means which receives said direction signal and said reference signal as input signals and which produces an output signal which varies in dependence upon said reference signal when said direction signal is in a first state, and which output signal is constant irrespective of changes in said reference signal when said direction signal is in a second state.

15. The apparatus of claim 11 wherein said logic gate means comprises a first NAND gate which receives said direction signal and said feedback signal as input signals, and a second NAND gate which receives as an input signal the output signals from said first NAND gate said reference signal as input signals.

16. The apparatus of claim 10 further including means responsive to said reference and feedback signals for selectively enabling said up/down counter to count clock pulses.

17. Apparatus for detecting and controlling the speed of a movable member, comprising:

means for providing an increase/decrease speed signal related to both an actual speed and desired speed of said movable member;

means for providing a direction signal indicative of the direction of movement of said movable member relative to a reference direction of movement of said movable member;

an up/down counter for counting clock pulses;

means responsive to said direction signal and said increase/decrease speed signal for controlling said counter to selectively count up or down in dependence upon said increase/decrease speed signal when said direction signal indicates said direction of movement is the same as said reference direction, and for controlling said counter to count in only one direction, without regard to said increase/decrease speed signal, when said direction signal indicates direction of movement is different from said reference direction; and means responsive to said up/down counter for adjusting the speed of said movable member.

18. In a phase control circuit of the type in which the contents of an up/down counter is used to control the speed of a movable member, a method of controlling said counter so that the speed control operation is not direction sensitive, comprising the steps of:

detecting the direction of movement of said movable member;

causing said counter to selectively count up or down in dependence upon the state of a control signal related to at least one of the desired and actual speed of said movable member when said movable member is moving in a selected direction; and enabling said counter of count in only one direction when said movable member is moving in a direction other than said selected direction.

* * * * *